(12) United States Patent
Villefrance et al.

(10) Patent No.: US 7,615,968 B2
(45) Date of Patent: Nov. 10, 2009

(54) METHOD AND DEVICE FOR CHARGING A BATTERY AT ELEVATED TEMPERATURES

(75) Inventors: Rasmus Villefrance, Helsinge (DK); Markus Aaltonen, Pikkio (FI)

(73) Assignee: Nokia Corporation, Espoo (FI)

( * ) Notice: Subject to any disclaimer, the term of this patent is extended or adjusted under 35 U.S.C. 154(b) by 300 days.

(21) Appl. No.: 11/462,488

(22) Filed: Aug. 4, 2006

(65) Prior Publication Data

US 2008/0030171 A1 Feb. 7, 2008

(51) Int. Cl.
*H02J 7/04* (2006.01)
*H02J 7/00* (2006.01)
(52) U.S. Cl. ........................... 320/150; 320/134
(58) Field of Classification Search ........... 320/106, 320/107, 110, 111, 112, 114, 134, 136, 137, 320/150; 702/63; 700/313
See application file for complete search history.

(56) References Cited

U.S. PATENT DOCUMENTS 5,623,195 A 4/1997 Bullock et al.

2005/0189911 A1* 9/2005 Cheng ................... 320/111
2005/0253561 A1* 11/2005 Tibbs ................... 320/150
2006/0244315 A1* 11/2006 Kogan et al. ............ 307/150
2006/0279251 A1* 12/2006 Guyot et al. ............ 320/107

FOREIGN PATENT DOCUMENTS

KR 2000-0002336 1/2000

* cited by examiner

*Primary Examiner*—Edward Tso
*Assistant Examiner*—M'Baye Diao
(74) *Attorney, Agent, or Firm*—Locke Lord Bissell & Liddell LLP

(57) ABSTRACT

The present invention pertains to a method and device for charging a battery at elevated temperatures. More specifically the present invention pertains to a method and a device capable of using the method to charge a battery at elevated temperatures, comprising by determining a temperature of at least one cell of a battery to be charged, and limiting the charging voltage applied to said battery to a maximum charging voltage in accordance with said determined temperature.

13 Claims, 2 Drawing Sheets

METHOD AND DEVICE FOR CHARGING A BATTERY AT ELEVATED TEMPERATURES

TECHNICAL FIELD

The present invention pertains to a method and device for charging a battery at elevated temperatures. More specifically the present invention pertains to a method to charge Li-Ion (Lithium-Ion) batteries of mobile devices. This invention relates to charging of the battery in mobile phones. More specifically the present invention pertains to a charging method of the battery of a mobile communication device capable of performing video calls.

BACKGROUND

Standard Li-Ion chargers normally stop charging the battery if it gets too hot. At present it is known to use temperature sensors to interrupt the charging process of modern storage cells above a certain battery temperature to prevent a damage of the battery to be charged. When e.g. the temperature of a battery exceeds 60° C. (Centigrade) the charging process may be stopped to prevent a battery damage caused by partially overheated and vaporized electrolyte or e.g. by a thermally induced chemical reaction of at least one of the components of the battery cell. Up to now this interruption of the charging process was applicable as high temperatures where only reached in specific use cases, such as leaving e.g. a mobile phone on the dashboard in a hot car, connected to the cigarette lighter charger.

It is therefore desirable to be able to charge batteries even at high temperatures. Especially during e.g. a video call the phone may reach such a high temperature that standard charging methods would interrupt the charging procedure of the battery. It is desired to avoid this charging interruption because it is highly unpractical not being able to charge the battery when charging is most needed such as during the time a highly energy and resources consuming program being executed.

SUMMARY OF THE INVENTION

The present invention provides a method and a device to enable a battery of e.g. a mobile device to be charged even under high temperature conditions, which may occur e.g. in operation of high power applications running on mobile terminals. Conventionally Li-Ion batteries are charged until a battery voltage of 4.2 V is reached. However, if the Li-Ion battery temperature is above 60° C., a charging voltage of 4.2 V will damage the Li-Ion battery. The problem with small modern phones packed with electronics resides in that during normal use for example during a video call, the internal temperature may rise to a level above 60° C. As a consequence, it is not possible to charge the battery in normal operation without damaging it. It is therefore possible that a mobile device may run out of (battery) power during a video call, even when inserted into a charger. High battery voltage and high temperature will degrade the battery faster than low battery voltage and high temperature do.

According to a first aspect of the present invention a method is provided for charging a battery at elevated temperatures. The method comprises determining a temperature of at least one cell of a battery to be charged, and limiting the charging voltage applied to said battery to a maximum charging voltage in accordance with said determined temperature. The step of applying a charging voltage to the battery has not been explicitly cited but it seems clear that a method of charging a battery and limiting the charging voltage (and consequently the charging current) requires that a charging current is provided to the battery.

This method is different to the heat-controlled charging interruption, since in the heat controlled charging interruption there is no charging voltage applied/limited that may be controlled during interruption of the charging process (voltage cutoff–>no charging–>no charging voltage control and no charging voltage limitation).

This method requires knowledge of the voltage applied to the on the battery terminals, as well as of the temperature of the battery. It is for example possible to measure the voltage of the battery at the battery terminals, as well as the temperature of the battery to limit the battery charging voltage to the maximum charging voltage and/or the charging current accordingly. It should be noted that the term "charging voltage" is only defined for charging voltages that are nom-zero (i.e. a charging voltage may not be limited to "zero voltage). It may also be noted that maximum charging voltages are also defined to be non-zero.

It should be noted that in addition to the charging voltage limitation the charging voltage (or the charging current) may be controlled to achieve a constant current that is flowing through the battery to charge the battery (as long as the maximum charging voltage is not exceeded). The charging voltage or the charging current may for example be controlled by a feedback system to achieve a certain current equal to a desired reference value. It should be noted that the invention is not restricted to "voltage control charging processes volt" is not intended to be understood in the sense of constant charging voltage control only. The present invention also comprises the constant current charging procedures achieved by controlling the charging current (or the charging voltage) so that a constant charging voltage is achieved. The present invention provides an upper charging voltage limit in dependence of a temperature of at lest one battery cell. The present invention may be applied with constant voltage or constant current charging procedures. In case of constant current charging procedures the actual charging voltage may be selected at or below (but not above) the maximum charging voltage (even if this voltage may not achieve a desired "low temperature" charging current). In case of a constant current charger, the charging current is especially in case of nearly completely charged battery additionally limited by the maximum charging voltage for a certain temperature (range). That is, for low internal battery voltages or low battery temperatures the charging process is determined by a constant charging current. In case of high battery cell temperatures and high internal battery voltages (i.e. nearly completely charged battery cells) the charging current is limited by the maximum charging voltage that may be applied. In this case the maximum charging current for high temperatures is determined by the maximum charging voltage the internal voltage of the battery (cell) and the internal resistance of the battery cell. In case of a constant current charging process for low temperatures, the present invention may be considered as providing a transition of a constant current charging process to a constant voltage charging process when the temperature of the battery (and the internal charging current of the battery) exceeds a predetermined limit.

It is possible to survey (and charge) one, two of more battery cells of a battery separately and independently. However, as long as at least the temperature of one battery cell is surveyed during the charging process this should fall under the wording of this embodiment. It is for example envisaged to measure the temperature of the battery cell with the smallest heat spreading capability.

In an example embodiment of the present invention said charging voltage applied to battery is limited to a maximum charging voltage according to a function that relates said maximum charging voltage (and thus the maximum charging current) to the determined temperature. This embodiment may be used to implement a soft transition or a soft relation between the current battery temperature and a currently selected (maximum) battery charging voltage/current. This embodiment enables the use of e.g. continuous functions to limit the charging voltage/current in accordance with a currently or continuously determined battery (cell) temperature. This embodiment pertains to a closed loop controlled charging process at elevated temperatures.

In another example embodiment of the present invention said limiting said charging voltage applied to a battery to a maximum charging voltage comprises limiting the charging voltage applied to the battery to a first maximum charging voltage at a temperature below a first threshold temperature, and limiting the charging voltage applied to the battery to a second maximum charging voltage at a temperature above said first threshold temperature, wherein said second maximum charging voltage is smaller than said first maximum charging voltage. This embodiment pertains to a charging characteristic with a step function of the charging voltages that maximally may be applied to the battery. Above a certain temperature the maximum charging voltage that may be applied during a charging process is reduced to a lower voltage to prevent battery damage. By measuring (the battery voltage and) the temperature of the battery, it is possible to charge e.g. Li-Ion batteries at temperatures above e.g. 60° C. (Centigrade), as long as the absolute charging voltage maximally applied to the battery is lowered to 3.8 V. The first threshold for Li-Ion batteries should be set to 60° C. (Centigrade). This means the maximum charging voltage for Li-Ion batteries could be set to 4.2 V blow this 60° C. temperature threshold and to 3.8 V above this 60° C. temperature threshold. It should be noted that other (future) battery cells (with other chemical components) may require other (higher or lower) threshold temperatures and other maximum charging voltages.

In another example embodiment of the present invention said limiting of said charging voltage applied to said battery to a maximum charging voltage comprises limiting said voltage applied to said battery to said second maximum charging voltage at a temperature above said first threshold temperature and below a second threshold temperature, wherein said second threshold temperature is higher than said first threshold temperature, and applying no charging voltage to said battery above said second threshold temperature. This embodiment pertains to an implementation in which the (continuous function or the) step function is combined with voltage cut-off above a selected battery temperature limit. This option may be used to prevent battery damage at temperatures above the second threshold temperature at which even the reduced maximum charging voltage for elevated temperatures may cause damage to the battery.

By measuring the temperature of the battery, it is for example possible to charge a Lithium (e.g. a Li-Ion-) battery in a temperature range between e.g. 60° and 70° C. At temperatures below 60° C. the voltage that maximally may be applied e.g. to the Li-Ion battery i.e. the maximum charging voltage is limited to 4.2 V. In the temperature range between e.g. 60° and e.g. 70° C. the charging voltage may be limited to an absolute maximum charging voltage of e.g. 3.8 V. Above 70° C. it may be necessary to interrupt the charging process of a Li-Ion battery completely.

It has been found out that it is possible to charge a Li-Ion battery up to a maximum charging voltage of 3.8 V in the range 60° C. -70° C. This allows e.g. a mobile phone powered with such a battery to operate as specified in this temperature range. For example, if a user leads a video call and inserts the phone onto a charger to continue the call, even when the power is about to run out, it becomes possible to charge the battery even if the load of the video call increases the temperature of the phone and the battery to a critical temperature limit.

In another example embodiment of the present invention the method further comprises detecting a connection to an external power source. When a connection to an external power source is detected the charging method may be started upon the detection of said connection to an external power source (i.e. a charger).

In another example embodiment of the present invention the method further comprises determining electric parameters of at least one cell of said battery, and limiting a charging voltage applied to said battery to a maximum charging voltage in accordance with said determined electric parameters.

The determination of electric parameters may comprise the determination of the internal resistance (of at least one battery cell), the determination of the internal voltage (of at least one battery cell), the determination of a current power consumption/energy deposition (of at least one battery cell) during the charging process or e.g. a defined discharging current (of at least one battery cell) or the electric capacity (of at least one battery cell) as e.g. the integrated charging current.

With these additional measuring values it may be possible to provide the best (fasted, most caretaking, or reaching the highest charging condition) charging procedure.

In another example embodiment of the method of the present invention further comprises controlling the charging voltage applied to said battery (below said maximum charging voltages) to achieve a constant charging current in accordance with said determined temperature. It is also envisaged to control the charging voltage applied to said battery (/below said maximum charging voltage) to achieve a constant charging current in accordance with said determined electric parameters. It is envisaged to provide the constant current charging controller in a respective device that may be connected to a respective charging voltage limiter (to combine the features of charging voltage limiter and constant current charging). This embodiment pertains to an application employing constant current charging, which may be advantageous for certain battery charging applications. It should be noted that it is also envisaged to implement a constant voltage charger with a charging voltage limiter.

In another example embodiment of the present invention the method is executed on a mobile terminal device. In this embodiment of the present invention the charging electronic is incorporated in a mobile terminal device. This embodiment provides the advantage that the battery of the mobile device may be charged with any compatible charger device, e.g. it is known that it is be possible to charge e.g. (nearly) any Nokia cellular phone with (nearly) any Nokia cellular phone charger without the danger of damaging the battery of the device. With this concept another advantage resides in that it is nearly impossible to damage the battery by using the "wrong" charger device.

In another example embodiment of the present invention the method is executed on a mobile telephone. This is especially useful as the requirements for mobile and/or cellular phones with regard to battery power average operation time, weight and user friendliness as well as reliability and intuitive operability is still increasing. Therefore it is especially in the field of mobile phones desirable that a phone connected to a charger has actually charged batteries under any circumstances. Otherwise the user may expect a damaged or faulty product and may think he paid for a broken or damaged mobile phone or mobile phone charger.

In another example embodiment of the present invention the method is executed on a battery of a mobile terminal device. This embodiment refers to a battery with built-in charger logic or charger controller or charging voltage limiter. This embodiment is especially useful for retrofitting e.g. mobile phones with high grade batteries without the danger of damaging the batteries in operation.

In another example embodiment of the present invention the method is executed on a battery charger of a mobile terminal device. This embodiment represents the counterpart to the intelligent battery, a charger that automatically determines a temperature of a battery and does limit charging voltage that may be applied to the battery to the maximum charging voltage (or the charging current) accordingly. For this embodiment it may be necessary to implement an in battery temperature sensor, that is connectable to said charger device.

According to yet another aspect of the invention, a software tool is provided comprising program code means for carrying out the method of the preceding description when said program product is run on a computer or a network device.

According to another aspect of the present invention, a computer program product downloadable from a server for carrying out the method of the preceding description is provided, which comprises program code means for performing all of the steps of the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of the method contained in the preceding description, when said computer program is run on a computer, or a network device.

Preferably the computer program and the computer program product are distributed in different parts and devices. The computer program and the computer product device run in different devices of the device a charger and/or a battery. Therefore, the computer program and the computer program device have to be different in abilities and source code. It is for example envisaged to implement a constant current charging element in a charger or a device and to incorporate the charging voltage limiter in battery (or the device).

According to yet another aspect of the present invention a module for charging a battery at elevated temperatures is provided. The module comprises a battery terminal, a power terminal, a sensor terminal and a voltage limiter. Said battery terminal is provided for connecting said module to a battery to be charged at elevated temperatures. Said power terminal is provided for connecting said module to a power source such as e.g. a charger, a docking station or a power network. The sensor terminal is provided for connecting said module to a temperature sensor connected to or in vicinity of a battery to be charged. The voltage limiter or selector is connected to said battery terminal, said power terminal and to said sensor terminal. The voltage limiter or selector is configured for limiting the charging voltage applied to said battery terminal to a maximum battery charging voltage in accordance with a temperature sensor signal received at said sensor terminal, wherein said temperature sensor signal represents a temperature of at least one cell of a connected battery.

In a very simple example embodiment the present invention may be implemented e.g. as a bimetallic strip switch in thermal contact with at least one battery cell (representing the connection to the thermal sensor) and connecting the battery terminals to one of two different voltage (or current) sources each limited to a maximum charging voltage provided from a power source connected to the power terminal. It is also envisaged to implement such a module with a NTC (negative temperature coefficient) or PTC (positive temperature coefficient) used to control e.g. a voltage control transistor, so that the charging voltage applied to a battery is limited or reduced to or below a maximum charging voltage which is lowered when higher battery temperatures occur.

However, it is also possible to implement this module as a controller (maybe implemented as a small computer with respective software) connectable between the battery and the power source, employing a complex temperature to charging current function to provide the best possible maximum charging voltage for each battery temperature.

In an example embodiment of the present invention said voltage limiter is configured to limit said charging voltage to a maximum charging voltage according to a function that relates said maximum charging voltage to the received temperature sensor signal. In the above exemplary implementation examples the bimetal bimetallic strip may provide a step function, while the relation between the maximum charging voltage and a determined battery (cell) temperature may arbitrarily be selected. The function that relates said maximum charging voltage to a determined battery temperature may be implemented by a mechanic or electric circuit or by a software implementation.

In another example embodiment said module further comprises a temperature sensor. This embodiment may serve to implement the module as a self contained component that may be integrated into a mobile device or into a battery of mobile device.

In another example embodiment of the present invention said voltage limiter is configured to limit the charging current allied to the battery to first maximum charging voltage at a temperature below a first threshold temperature, and to limit the charging voltage applied to the battery to second maximum charging voltage at a temperature above said first threshold temperature, wherein said second maximum charging voltage is smaller than said first maximum charging voltage. This embodiment may ensure that the internal resistance of the battery in combination with the charging current does not increase the temperature of the battery (especially in case of a Li-Ion or Li-Polymer battery).

In yet another example embodiment of the present invention said voltage limiter is configured to limit said charging voltage applied to said battery to a second charging voltage at a temperature above said first threshold temperature and below a second threshold temperature, wherein said second threshold temperature is higher than said first threshold temperature, and is further configured to apply no charging voltage to said battery above said second threshold temperature. This embodiment represents an (at least) two step function of the maximum charging voltages (or currents), that is cut-off if a selected upper (critical) battery temperature is exceeded.

In just another example embodiment of the present invention said voltage limiter is configured to detect a connection to an external power source that is connected to said power terminal. With this feature the module is capable of starting the temperature dependent charging process after it ha been determined that a power supply (such as a charger) has been connected to the module. This embodiment is directed to device having a built-in battery charge electronic or to a battery charger device itself In still another example embodiment of the present invention said voltage limiter is configured to detect a connection to a battery (to be charged) that is connected to said battery terminal. This embodiment is directed to a charging module built-into a terminal device at which different battery cells may be connected to. This embodiment is directed to a device capable of being used e.g. with a Li-Ion battery cell without a charging device integrated into the battery.

In another additional example embodiment of the present invention said voltage limiter is configured to detect a connection to a temperature sensor connected to said temperature sensor terminal. This embodiment may be implemented in a charger or in a mobile electronic device in which batteries with internal temperature sensors are used. This embodiment may also be used to indicate a certain type of battery e.g. conventional batteries without any temperature sensors, and e.g. Li-Ion batteries with internal thermal sensors.

In another example embodiment of the present invention said voltage limiter of the module is configured to determine electric parameters of at least one cell of said battery, and is further configured to limit the charging voltage applied to said battery to a maximum charging voltage in accordance with said determined electric parameters.

The voltage limiter is configured to determine of electric parameters of the battery (cell) e.g. by evaluating electrical and charging parameters of the battery. These parameters may comprise the charging voltage(s) actually applied to the battery cell, charging current(s) and may also may comprise the internal resistance (of at least one battery cell), the internal voltage (of at least one battery cell), a current power consumption/energy deposition (of at least one battery cell) during the charging process or at a defined discharging current (of at least one battery cell) or the electric capacity (of at least one battery cell) as e.g. the integrated charging current.

With these additional measuring values it may be possible to provide the best (fasted, most caretaking, or reaching the highest charging condition) charging procedure.

According to yet another aspect of the present invention a mobile terminal device for charging a battery of said mobile terminal device at elevated temperatures is provided. The mobile terminal device, comprises a battery of said mobile terminal device, a power terminal, (at least one) temperature sensor in thermal contact with at least one of said at least one battery cells, and a voltage limiter. The battery of said mobile terminal device has at least one battery cell. The power terminal is provided for connecting said mobile terminal device to an (external) power source (such as a charger or a docking station of said mobile terminal device). The temperature sensor is in thermal contact with at least one of said at least one battery cells, to be able to determine a temperature of at least one of said at least one battery cell. It may also be envisaged to use for each cell an independent temperature sensor. The temperature sensor is connected to or in vicinity of (at least one of said) battery cells. The voltage limiter is connected to said battery, to said power terminal and to said temperature sensor, for limiting a battery charging voltage applied to said battery to a maximum battery charging voltage in accordance with a temperature sensor signal received from said (at least one) temperature sensor, wherein said temperature sensor signal represents a temperature of at least one cell of a connected battery.

In an example embodiment of the present invention the voltage limiter of the mobile terminal device is configured to limit the charging voltage applied to said battery to said maximum charging voltage according to a function that relates said maximum charging voltage to the received temperature sensor signal. This function that relates said maximum charging voltage that may be applied to the battery to the received temperature sensor signal may be achieved by mechanical, electrical, electronic or even software implementations. It is for example possible to use a self resetting temperature fuse in combination with a voltage divider to reduce the maximum charging voltage that may be applied to the battery from a certain threshold temperature. In such a hardware implementation the sensor part is enclosed in the temperature fuse and the limiter part is partially implemented e.g. in a voltage divider and partially implemented in the temperature fuse. It is also envisaged to utilize power sources that provide different maximum charging voltages, so that the invention may be implemented without a voltage divider that generates addition heat. It is also possible to use a switching power supply to reduce the heat generated by the voltage limiter while reducing the maximum charging voltage that may be applied to the battery from the maximum cold charging voltage to the maximum elevated temperature charging voltage.

In another example embodiment of the present invention said voltage limiter is configured to limit the charging voltage applied to the battery to a first maximum charging voltage at a temperature below a first threshold temperature, and to limit the charging voltage applied to the battery to a second maximum charging voltage at a temperature above said first threshold temperature, wherein said second maximum charging voltage is smaller than said first maximum charging voltage. In case the temperature of the battery cell rises above a certain limit (the threshold temperature) the maximum charging voltage that may be applied to the battery is reduced to prevent higher temperatures of the battery (cell) which may result in damage to the battery (cell). It may be noted that it is envisaged to use a number of temperature sensors (e.g. at least on per battery cell) in combination with only a single voltage limiting device, so that the maximum charging voltage that may be applied to the battery may be reduced in one of the cells reaches a critical temperature (i.e. the threshold temperature). With such an embodiment it may be achieved that the cells of a battery are charged substantially similarly, so that the charging condition of each cell may be similar. With such a multi-cell battery it may be possible to prevent inversely charged cells in a multi-cell battery.

It is possible to use a temperature sensor (e.g. in an application specific integrated circuit (ASIC) of e.g. a mobile phone) to determine the temperature of the battery (cell). It is also envisaged to use an A-D converter in the phone ASIC (and a software algorithm) to determine the battery voltage and temperature. It is possible to implement the invention by a software running in the Main Computing Unit that controls the charge switch, so that charging of a Li-Ion battery is continued even on temperatures over 60° C. (but below 70° C.), but only as long as the battery voltage is below 3.8 V. It may be noted that the voltage values are to be interpreted in units of "voltage per cell" for Li batteries especially for Li-Ion batteries.

In yet another example embodiment of the present invention said mobile terminal device is a mobile telephone. Mobile phone and similar communication devices have increasing requirements for processing power and therefore require batteries with increased capacity and performance. Especially, when using mobile electronic devices it is desirable to employ high performance batteries such as Li-Ion and Li-Polymer batteries which are especially susceptible to damage when charged with normal maximum charging voltage or charging current in a temperature range above 55° C. or when operated in a temperature range above 60°C.

In still yet another example embodiment of the present invention said mobile terminal device is a battery of a mobile device. Then embodiment pertains to a "mobile power supply terminal" with a built-in battery, i.e. a power terminal with an internal battery and a built-in charging voltage limiter or charging temperature limiter. This embodiment is especially useful for Li-Ion and Li-Polymer batteries which may easily be damaged by the wrong (maximum) charging voltages/currents and states (i.e. deep discharge), operation currents, and operation and even storage temperatures.

In still another example embodiment of said mobile terminal device said voltage limiter is configured to detect a connection to a temperature sensor connected to said temperature sensor terminal. The voltage limiter may detect an external power supply by a dedicated switching contact provided at the power terminals, or e.g. by a voltage measurement at the power terminals.

In another example embodiment of the present invention the voltage limiter of the mobile terminal device is configured to determine electric parameters of at least one cell of said battery, and is further configured to limit the charging voltage applied to the battery (terminals) to a maximum charging voltage in accordance with said determined electric parameters.

The determination of electric parameters may explicitly comprise the determination of the internal resistance (of at least one battery cell), the determination (of at least one battery cell), the determination of a current power consumption/energy deposition (of at least one battery cell) during the charging process or e.g. a defined discharging current (of at least one battery cell) or the electric capacity (of at least one battery cell) as e.g. the integrated charging current.

With these additional measured values it may be possible to provide the best (fasted, most caretaking, or reaching the highest charging condition) charging procedure.

BRIEF DESCRIPTION OF THE FIGURES

In the following, the invention will be described in detail by referring to the enclosed drawings in which.

DETAILED DESCRIPTION

Figure 1:
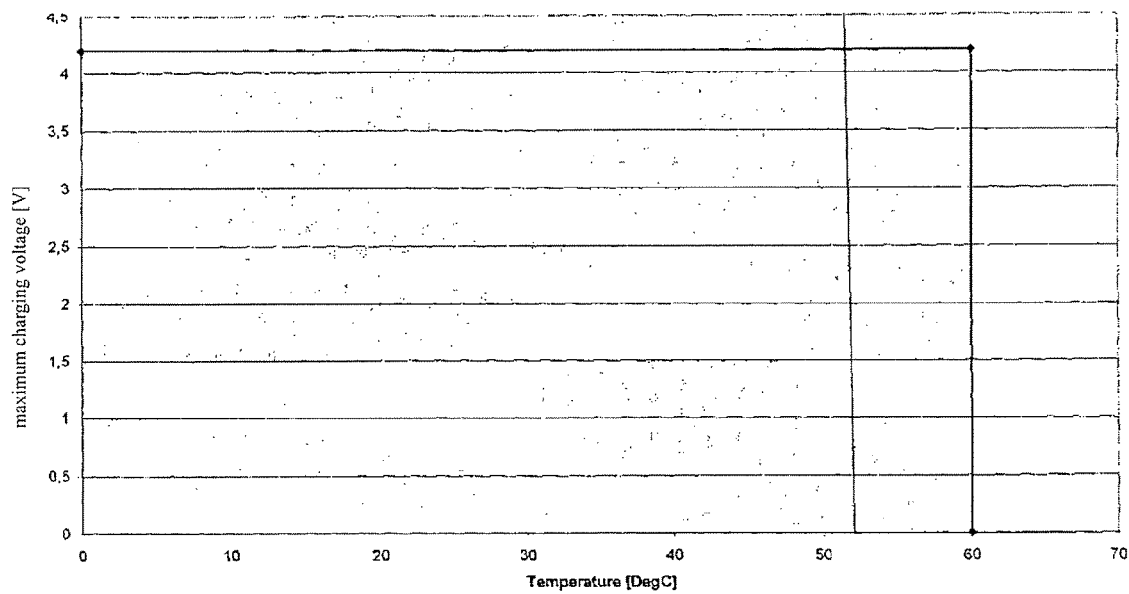
FIG. 1 shows an existing charging characteristic of maximum charging voltage as a function of temperature.

In the following detailed description, identical components have been given the same reference numerals, regardless whether they are shown in different embodiments of the present invention. In order to clearly and concisely illustrate the present invention, the drawings may not necessarily be to scale and certain features may be shown in somewhat schematic form.

FIG. 1 shows an existing charging characteristic of maximum charging voltage for Li-Ion battery as a function of temperature. As can bee seen in the diagram a constant maximum charging voltage of 4.2 V is applied to a Li-Ion battery in a temperature range between 0° C. and 60° C. Above a temperature of 60° C. the charging process of the Li-Ion battery is interrupted and no voltage is applied to the battery to be charged.

Figure 2:
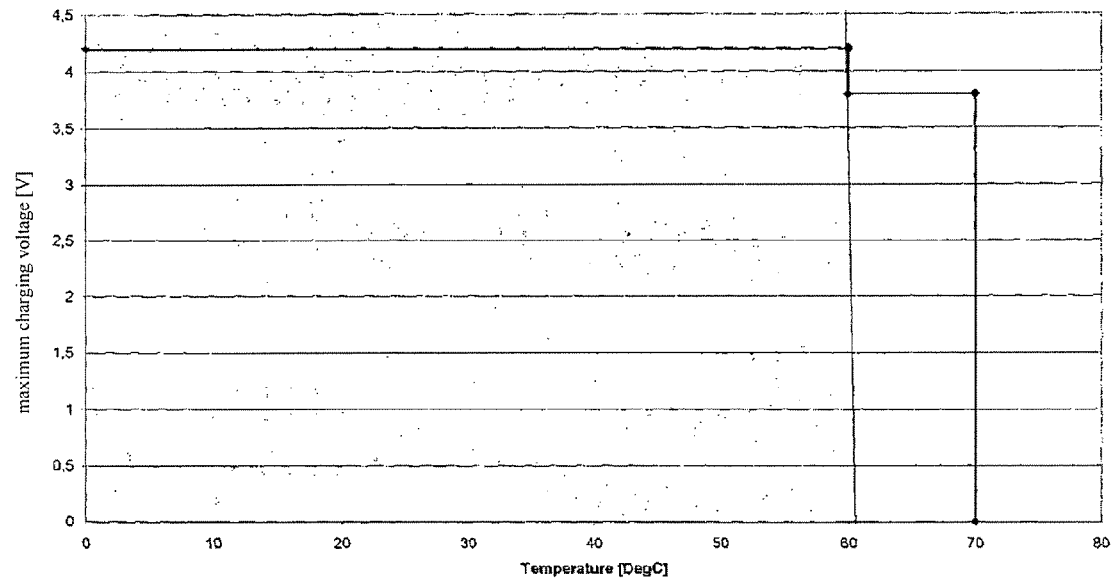
FIG. 2 shows a charging characteristic according to the present invention of maximum charging voltage as a function of temperature.

FIG. 2 shows a charging characteristic according to the present invention of maximum charging voltage as a function of temperature. (It should be noted that the graph shows an upper limit for the charging voltage and not the charging voltage (or the charging voltage resulting from constant current charging) actually applied). It may also be noted that FIG. 2 is directed to Li-Ion batteries, and that the temperature limits/thresholds and the maximum charging voltage limits are specified for Li-Ion cells. As can bee seen in the diagram a constant maximum charging voltage of 4.2 V is applied 5 to the Li-Ion battery (cell) in a temperature range between 0° C. and 60° C. Above a temperature of 60° C. and below a temperature of 70° C. the maximum charging voltage is reduced to a value of 3.8 V. Above a temperature of 70° C. the charging process is interrupted and no voltage is applied to the battery to be charged. It should be noted that other (future) battery cells (with other chemical components) may require other (higher or lower) threshold temperatures and other maximum charging voltages.

Figure 3:
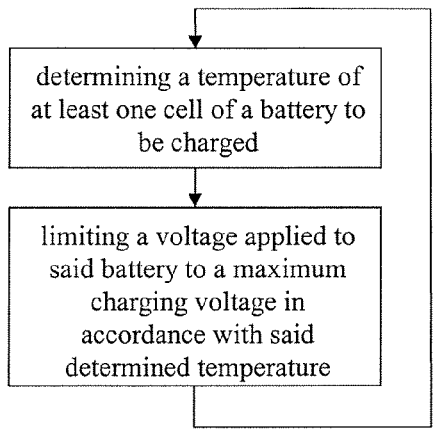
FIG. 3 shows a flowchart of the method of the present invention.

FIG. 3 shows a flowchart of the method of the present invention. The method for charging a battery at elevated temperatures starts with determining a temperature of at least one cell of a battery to be charged and continues with limiting the charging voltage applied to the battery to a maximum charging voltage in accordance with said determined temperature.

It is for example envisaged to limit the charging voltage that may be applied to the Li-Ion battery to a voltage of 4.2 V at each Li-Ion battery cell if the temperature of this cell is below 58° C. to 62° C. In a temperature range between 58° C. and 62° C. and 68° C to 72° C the maximum charging voltage that may be applied may be restricted to 3.8 V. If the temperature of the battery cell exceeds the threshold temperature between 68° C. and 72° C. the charging process may be stopped to prevent damage of the battery cell. It should be noted that the present invention may also be applied to other (future) battery cells using another combination of chemical components using other (higher or lower) threshold temperatures and other maximum charging voltage limitations.

Figure 4:
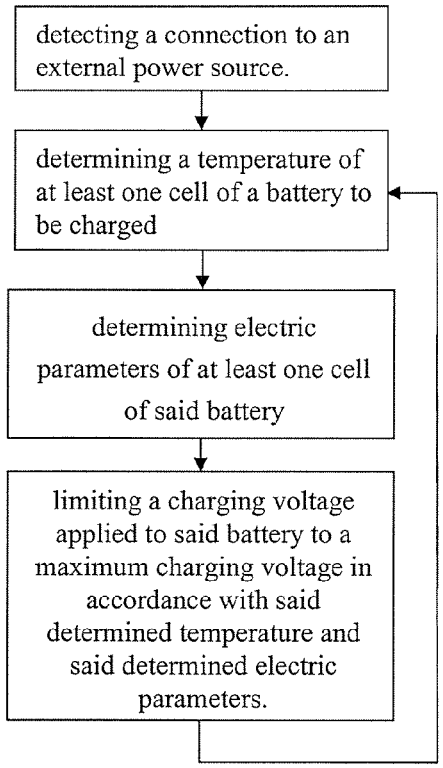
FIG. 4 shows another flowchart of another embodiment of the method of the present invention.

FIG. 4 shows another flowchart of another embodiment of the method of the present invention. The flowchart of FIG. 4 extend the flowchart of FIG. 3 by the determination of additional electrical battery parameters such as the internal resistance of the battery, the charging condition of the battery or the current internal voltage of the battery (cell). This embodiment of the present invention may serve on one hand to extend known charging procedures by a temperature dependency in a temperature range between 60° C. and 70° C. to enable a charging operation of Li-ion batteries even under high temperature conditions. This embodiment of the present invention may on the other hand serve to implement charging procedures that enable charging procedures in a temperature range of between 60° C. and 70° C. wherein the maximum charging voltage additionally depends on electrical parameters of the Li-ion battery cell that is charged.

Figure 5:
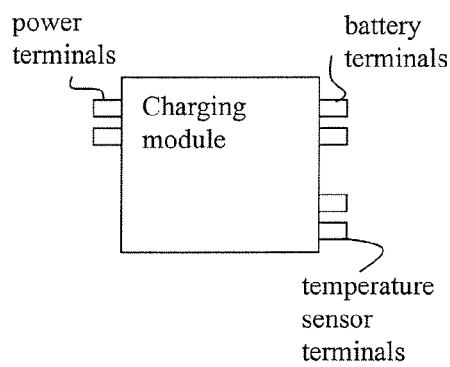
FIG. 5 is an example of a charging module according to the present invention.

FIG. 5 is an example of a charging module according to the present invention. In this embodiment the charging module is provided with terminals to connect to a power source (the power terminals), to connect to the battery (the battery terminals) and to a temperature sensor (the temperature sensor terminals). As the main part of the invention resides in the method of the present invention there are different possible implementations for the charging module. In a simple embodiment the charging module for Li-Ion cells is provided with two different maximum charging voltages of e.g. 3.8 and 4.2 V.

The charging module for Li-ion cells is connected to a temperature sensor such as e.g. a bimetallic switch opening a connection at temperatures above 60° C.

The charging module for Li-Ion cells/batteries may directly connect the power terminal restricted to a maximum voltage or 3.8 V to the battery terminals (via a diode), so that always possible to apply a charging voltage that reaches a maximum charging voltage of 3.8 V to the Li-Ion battery (cell).

The bimetallic switch (as sensor) may be connected to the sensor terminals looped in between the power terminal limited to a 4.2 V maximum charging voltage and the Li-Ion battery terminal, so that the opening of the switch/sensor may interrupt the temperature sensor terminals. If the temperature of the battery cell is below 60° a charging voltage (current) restricted to a maximum voltage of 4.2 V is supplied to the Li-Ion battery. In this case the diode in the 3.8 V power supply line serves to prevent any currents from the (connected) maximum 4.2 V to the maximum 3.8 V terminals of the power supply. If the temperature of the Li-Ion battery cell is above 60° C. the bimetallic switch interrupts the maximum 4.2 V connection to the battery (cell) and the Li-Ion battery cell is charged by a voltage limited to a maximum charging voltage of reduced 3.8 V from the 3.8 V power terminals.

Figure 6:
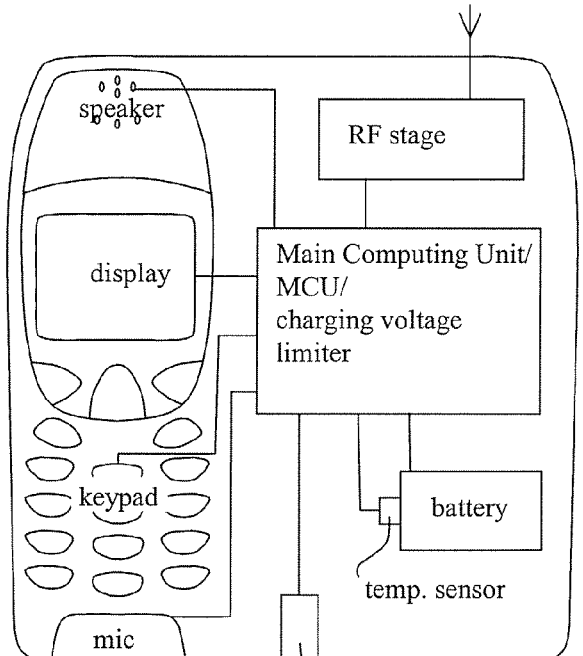
FIG. 6 is an example of a mobile terminal device capable of performing the charging process of the present invention.

FIG. 6 is an example of a mobile terminal device capable of performing the charging process of the present invention. The depicted mobile device is implemented as mobile or cellular telephone with a display, a keypad, a loudspeaker, a microphone (mic), a battery, an RF-stage a power terminal (to connect a battery charger) and a main computing unit (MCU) to enable all telephone functions as necessary. In the depicted mobile device the display, the keypad, the loudspeaker, the microphone (mic), the battery, the power terminal, and the RF-stage are all connected to the main computing unit to enable all telephone functions.

In the depicted embodiment the mobile telephone is provided with a temperature sensor thermally connected to the battery (cell) and electrically connected to the MCU. It is for example possible to use a built-in temperature sensor (e.g. in an application specific integrated circuit (ASIC) of e.g. a mobile phone MCU) to determine the temperature of the battery (cell). It is also envisaged to use an A-D converter in the phone ASIC (and a software algorithm) to determine the battery voltage and temperature. It is possible to implement the invention by a software running in the Main Computing Unit (MCU) that controls the charge switch, so that charging is continued even on temperatures over e.g. 60° C. (but below 70° C.), but only as long as e.g. the Li-Ion battery voltage is below 3.8 V.

With the present invention it is possible to use less heat limitations for charging batteries. This allows devices such as phones to be smaller and/or have more high-yielding hardware with the same user experience. Reduced battery voltage in high temperature will slow battery degradation more than high battery voltage in high temperature.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting especially to the voltage and temperature values given with respect to Li especially Li-Ion batteries. It should be noted that other (future) battery cells (with other chemical components) may require other (higher or lower) threshold temperatures and other maximum charging voltages. Thus the possibilities of implementing and using the invention are only restricted by the enclosed claims. Consequently various options of implementing the invention as determined by the claims, including equivalent implementations, also belong to the scope of the invention.

The invention claimed is:

1. Method for charging a battery, comprising:
determining a temperature of at least one cell of a battery to be charged, and
limiting the charging voltage applied to said battery to a maximum charging voltage in accordance with said determined temperature,
wherein said maximum charging voltage is controlled according to a function that relates said maximum charging voltage to the determined temperature, and
wherein said limiting of said maximum charging voltage comprises:
limiting the charging voltage applied to said battery to a first maximum charging voltage at a temperature below a first threshold temperature, and
limiting the charging voltage applied to said battery to a second maximum charging voltage at a temperature above said first threshold temperature,
wherein said second maximum charging voltage is smaller than said first maximum charging voltage, and
limiting the charging voltage applied to said battery to said second maximum charging voltage at a temperature above said first threshold temperature and below a second threshold temperature, wherein said second threshold temperature is higher than said first threshold temperature, and applying no charging voltage to said battery above said second threshold temperature.

2. Method according to claim 1, further comprising detecting a connection to an external power source.

3. Method according to claim 2, further comprising:
determining electric parameters of at least one cell of said battery, and
limiting the charging voltage applied to the battery to a maximum charging voltage to be applied to said battery in accordance with said determined electric parameters.

4. Method according to claim 1, further comprising controlling the charging voltage to achieve a constant charging current in accordance with said determined temperature.

5. Method according to claim 1, wherein the method is executed on a mobile terminal device.

6. Method according to claim 5, wherein the method is executed on a battery of a mobile terminal device.

7. Method according to claim 5, wherein the method is executed on a battery charger of a mobile terminal device.

8. Computer program product for executing a method capable of charging a battery, comprising: computer executable program code recorded on a computer readable storage medium, the computer executable program code for carrying out the method of claim 1, when said program code is run on at least one of a battery, a controller, a processor-based device, a mobile terminal device such as a mobile telephone and a charger of a mobile terminal device.

9. Module for charging a battery, comprising:
a battery terminal for connecting said module to a battery to be charged, a power terminal for connecting said module to a power source, a sensor terminal for connecting a temperature sensor and a voltage limiter connected to said battery terminal, said power terminal and to said sensor terminal, provided for limiting a battery charging voltage applied to said battery terminal to a maximum charging voltage in accordance with a temperature sensor signal received at said sensor terminal, wherein said temperature sensor signal represents a temperature of at least one cell of a connected battery, wherein said voltage limiter is configured to limit the charging voltage to said maximum charging voltage according to a function that relates said maximum charging voltage to the received temperature sensor signal to limit a charging voltage applied to said battery to a first maximum at a temperature below a first threshold temperature, and to limit a charging voltage applied to said battery to a second maximum charging voltage at a temperature above said first threshold temperature, wherein said second maximum charging voltage is smaller than said first maximum charging voltage, to limit said charging voltage applied to said battery to said second maximum charging voltage at a temperature above said first threshold temperature and below a second threshold temperature, wherein said second threshold temperature is higher than said first threshold temperature, and to apply no charging voltage to said battery above said second threshold temperature.

10. Module according to claim 9, wherein said voltage limiter is configured to detect a connection to an external power source connected to said power terminal.

11. Module according to claim 9, wherein said voltage limiter is configured to detect a connection to a battery to be charged connected to said battery terminal.

12. Module according to claim 10, wherein said voltage limiter is configured to detect a connection to a temperature sensor connected to said temperature sensor terminal.

13. Module according to claim 9, wherein said voltage limiter is configured to determine electric parameters of at least one cell of said battery, and is further configured to limit a charging voltage applied to the battery to a maximum charging voltage in accordance with said determined electric parameters.

* * * * *